June 20, 1961  J. B. GILL  2,989,142
WORK HORSE KIT
Filed May 19, 1958
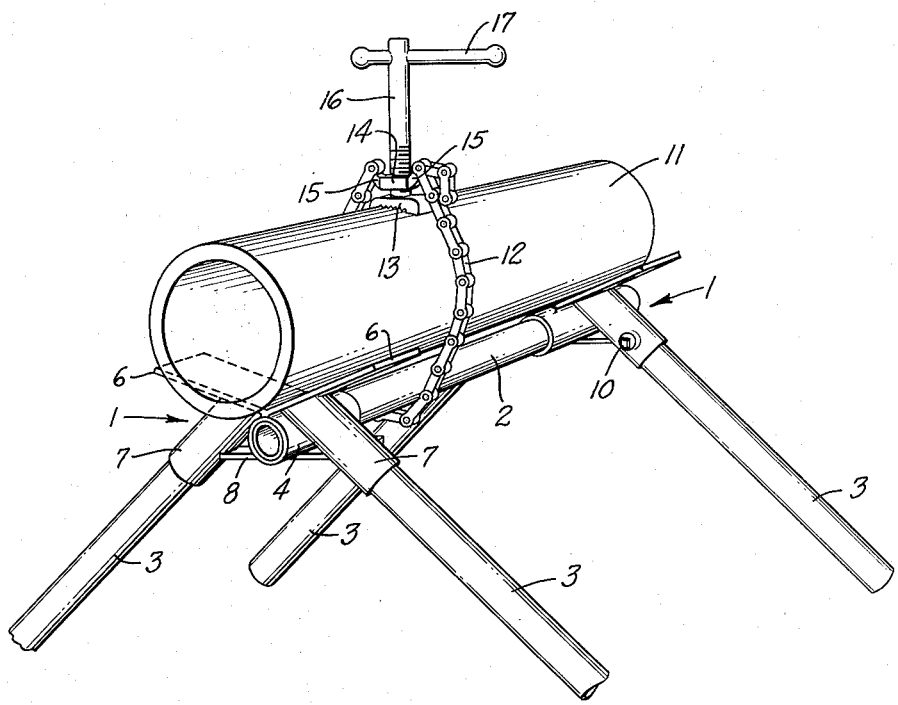
FIG_1_
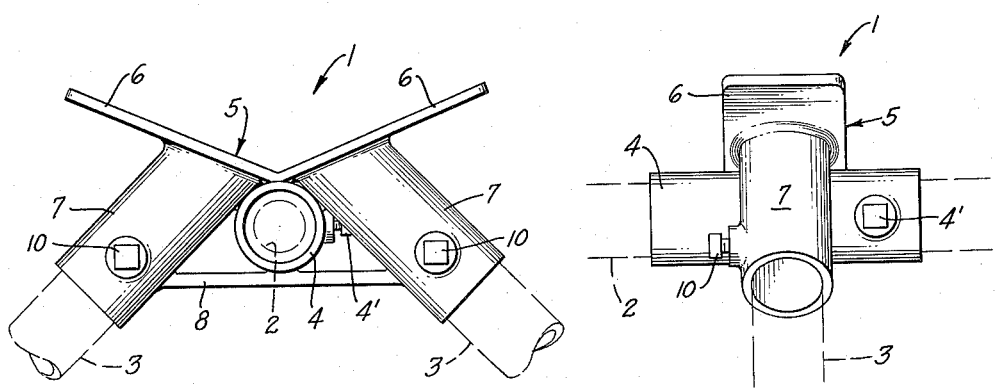
FIG_2_  FIG_3_
INVENTOR.
John B. Gill
BY
*A. Schapp*
ATTORNEY.

United States Patent Office 2,989,142
Patented June 20, 1961

2,989,142
WORK HORSE KIT
John B. Gill, 3970 Pacific Coast Highway, Torrance, Calif.
Filed May 19, 1958, Ser. No. 736,188
2 Claims. (Cl. 182—224)

The present invention relates to improvements in a work horse kit. The term "work horse" is commonly applied to a saddle structure used for supporting a piece of work, such as a log, a piece of lumber, a pipe or the like in elevated horizontal position for facilitating certain operations, such as sawing, cutting, machining and the like.

The work horse of the present invention is particularly intended for the proper mounting of asbestos-cement pipe of various dimensions, and its principal object is to make the work horse of a number of separable parts which may be readily assembled into a complete work horse and may be readily disassembled for accommodation in a kit which can be conveniently stored and carried from place to place to facilitate field operations, such as are generally encountered in the laying, cutting, fitting and machining of asbestos-cement pipe in the field.

More particularly, it is proposed to divide the work horse into a number of separable parts including a connecting tube, commonly referred to as a strong back, a pair of cradle heads slidable and adjustable on the tube to provide a desired spacing, and legs for supporting the heads, the legs being arranged at a relatively wide angle to secure a safe mounting for the pipe carried by the cradle heads.

The legs may be furnished in different lengths to suit the convenience of the operator.

It is further proposed to provide cradle heads of a novel design, which provide suitable support for a wide range of pipe sizes, and form a compact, rigid unit structure, easily accommodated in a kit and readily connected to the other parts to form a complete working unit.

It is additionally proposed to provide, as a part of my work horse kit, a chain binder adapted for firmly tying the pipe to the work horse after the pipe has been positioned, so as to serve the purpose of a vise.

Further objects and advantages of my invention will appear as the specification proceeds, and the new and useful features of the same will be fully defined in the claims attached hereto.

The preferred form of my invention is illustrated in the accompanying drawing, forming part of this application, in which:

FIGURE 1 shows a perspective view of the assembled work horse, with a pipe mounted thereon and anchored thereto;

FIGURE 2, an end view of a saddle head used in my invention; and

FIGURE 3, a side view of the same.

While I have shown only the preferred form of my invention, it should be understood that various changes or modifications may be made within the scope of the claims hereto attached, without departing from the spirit of the invention.

Referring to the drawing in detail, my work horse comprises, in its principal features, a pair of symmetrical saddle heads 1, a connecting tube 2 carried thereby and legs 3 supporting the heads.

Each saddle head comprises a central sleeve 4 adapted to slidably receive the tube 2, a cradle 5 supported on the top face thereof and consisting of a pair of plates 6 rising from the sleeve 4 in angular relation, a pair of tubular sockets 7 having their upper ends secured, as by welding, to the underfaces of the plates and diverging downwardly, on opposite sides of the sleeve 4, and a brace 8 connecting the sockets immediate underneath the sleeve 4.

The entire saddle structure is preferably made of metal, and the bottom of the saddle, the sockets 7 and the brace 8 are made to contact the sleeve 4 and are firmly secured thereto at the contact areas, as by welding.

The sleeves 4 of the two cradle heads are slidable on the connecting tube 2 and may be adjusted thereon to any desired spacing and locked in place by set screws 4'. It will be understood that the tube 2 may be furnished in various lengths to suit the requirements of any work.

The legs 3, which are preferably made in the form of metal tubes, are slidably received in the sockets 7 and the upper ends may be anchored by suitable set screws 10. The legs may also be furnished in different lengths to suit the convenience of the operator.

The work horse, as described, may be easily taken apart by removing the legs from the sockets and by sliding the saddle heads off the connecting tube 2, and the different parts thus obtained may be readily accommodated in a kit of convenient size.

After the asbestos-cement pipe, shown at 11, has been properly positioned on the two saddles, as shown in FIGURE 1, it may be readily anchored to the tube 2 by means of a chain 12, which is provided with any suitable means for tightening the same upon intermediate sections of the pipe and the tube.

The tightening means are here shown as comprising a base 13 for lying against the pipe, a nut 14 provided with ears 15 adapted to have opposing chain links secured thereon, and a bolt 16 threaded into the nut and bearing on the base, the bolt being operable by a handle 17 for drawing the nut away from the pipe and for tightening the chain upon the pipe and the tube 2.

The legs 3 and the connecting tube 2 are preferably made of steel pipe one and one-half inches in diameter and the usual length of the legs will be about forty-four inches, while the preferred length of the connecting tube is six feet.

The saddle plates are made to form a large angle, say approximately 130 degrees, and are sufficiently long to support pipes from two inches to sixteen inches in diameter.

I claim:

1. A head for a work horse kit, comprising a horizontal sleeve, a cradle having a straight bottom line and two straight wings rising therefrom in angular relation, the cradle being fixed directly upon the upper face of the sleeve at the bottom line, with the latter in direct contact with the sleeve and with the wings spreading outwardly in opposite directions, a pair of sockets projecting downwardly and outwardly from the cradle on opposite sides of the sleeve and having their ends secured directly upon the sleeve surface adjacent to said bottom line, with the lower ends of the sockets projecting downwardly below the bottom plane of the sleeve, and a bracing member connecting the lower ends of the sockets and fixed upon the bottom face of the sleeve.

2. A head for a work horse kit, comprising a horizontal sleeve, a cradle having a straight bottom line and two straight wings rising therefrom in angular relation, the cradle being fixed directly upon the upper face of the sleeve at the bottom line, with the latter in direct contact with the sleeve and with the wings spreading outwardly in opposite directions, a pair of sockets projecting downwardly and outwardly from the cradle on opposite sides of the sleeve and having their upper ends secured directly upon the sleeve surface adjacent the said bottom line, with the lower ends of the sockets projecting downwardly below the bottom plane of the sleeve, and a bracing member connecting the lower ends of the sockets and fixed upon the bottom face of the sleeve, the bottom line of the cradle, the sockets and the brace being permanently secured to the sleeve so as to form a rigid unit therewith.

References Cited in the file of this patent

UNITED STATES PATENTS

| | | |
|---|---|---|
| 488,349 | Bradley | Dec. 20, 1892 |
| 1,156,965 | Ackerman | Oct. 19, 1915 |
| 1,225,981 | Loughridge | May 15, 1917 |
| 1,408,675 | Wimberg | Mar. 7, 1922 |
| 1,458,738 | Teeken | June 12, 1923 |
| 1,622,506 | Graves | Mar. 29, 1927 |
| 1,765,685 | Mansfield | June 24, 1930 |
| 2,466,323 | Meyer | Apr. 5, 1949 |